United States Patent
Ballal et al.

(10) Patent No.: US 8,797,856 B1
(45) Date of Patent: Aug. 5, 2014

(54) FEEDBACK FOR MACHINE TO MACHINE DEVICES TO ACCOUNT FOR FAILURE OF NETWORK ELEMENTS

(75) Inventors: Dhiraj Ballal, Santa Clara, CA (US); Venkatesh Badakere Ramachandra, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 584 days.

(21) Appl. No.: 12/946,330

(22) Filed: Nov. 15, 2010

(51) Int. Cl.
*G06F 11/30* (2006.01)
*G01R 31/08* (2006.01)
*H04J 3/14* (2006.01)
*H04W 24/00* (2009.01)

(52) U.S. Cl.
USPC ........... 370/230; 370/235; 370/242; 455/424; 455/510; 709/225

(58) Field of Classification Search
USPC .......... 455/510, 517, 423–424; 370/230–235, 370/242; 709/224–226
See application file for complete search history.

(56) References Cited

U.S. PATENT DOCUMENTS

| | | | | |
|---|---|---|---|---|
| 2011/0182177 A1* | 7/2011 | Sedlacek et al. | ............... | 370/230 |
| 2011/0199905 A1* | 8/2011 | Pinheiro et al. | ............... | 370/235 |
| 2011/0201307 A1* | 8/2011 | Segura | ........................... | 455/411 |
| 2011/0269473 A1* | 11/2011 | Ronneke et al. | ............... | 455/445 |
| 2012/0047551 A1* | 2/2012 | Pattar et al. | ........................ | 726/1 |
| 2012/0051235 A1* | 3/2012 | Kotecha et al. | ................ | 370/252 |
| 2013/0051228 A1* | 2/2013 | Kim et al. | ..................... | 370/230 |

* cited by examiner

*Primary Examiner* — Habte Mered
(74) *Attorney, Agent, or Firm* — Shumaker & Sieffert, P.A.

(57) ABSTRACT

Wireless devices that are attempting to connect to a packet data network may be blocked from issuing connection requests to the network during periods in which, due to the failure of other network devices, the connections requests will fail. A device may particularly determine when a connection request to access a network, from a machine to machine (M2M) device, will fail or has failed. The device may create, in response to the connection request, a response to the connection request, the response including an indication that the M2M device is to be blocked, by other network devices, from accessing the network. The device may transmit the response to the connection request to the other network devices, the response to the other network devices including one or more parameters that identify a duration for which the M2M device is to be blocked and an identification of the M2M device.

24 Claims, 11 Drawing Sheets

FEEDBACK FOR MACHINE TO MACHINE DEVICES TO ACCOUNT FOR FAILURE OF NETWORK ELEMENTS

BACKGROUND

Machine-to-Machine (M2M) communications may refer to technologies that allow devices to communicate with one another over wired or wireless networks. An M2M device may include a sensor, meter, or other device that captures an "event" (temperature, inventory level, etc.), which is relayed through a network (wireless, wired, or hybrid) to an application that translates the captured event into meaningful information (e.g., items need to be restocked).

M2M applications are commonly deployed using wireless systems such as the Universal Mobile Telecommunications System (UMTS) or Long Term Evolution (LTE). M2M devices using UMTS/LTE for machine communication can be found in a number of economic sectors, such as security, product tracking, health care, and remote monitoring and diagnostics.

M2M devices, in order to save power and minimize the use of network resources, may connect to a wireless network only when necessary to upload or download information. For example, an M2M monitoring device may connect to the network at a certain time each day, upload information relating to the connection, and disconnect. Some M2M devices, if unable to successfully connect to the network at its designated time, may simply retry to connect to the network, potentially indefinitely. Each connection attempt may undesirably use network resources, such as radio interface or other network resources.

SUMMARY

One implementation is directed to a network device-implemented method that may include determining, by the network device, when a connection request to access a network, from a M2M device, will fail or has failed. The method may further include creating, by the network device and in response to the connection request, a response to the connection request, the response including an indication that the M2M device is to be blocked, by other network devices, from accessing the network. The method may further include transmitting the response to the connection request to the other network devices, the response to the other network devices including one or more parameters that identify a duration for which the M2M device is to be blocked and an identification of the M2M device.

In another possible implementation, a network device may include a network device failure detect component to monitor a health status of other network devices that are used in establishing connections from M2M devices to a packet data network. The network device may further include a M2M block reconnect component to cause, in response to a connection request from an M2M device to the packet data network and when the health status of at least one of the other network devices has failed such that a connection request from the M2M device to the packet data network has failed or will fail, blockage of additional connection requests from the M2M device to the packet data network.

In yet another possible implementation, a computing device may be provided in a network. The computing device may include a memory to store a plurality of instructions and a processor to execute instructions in the memory. The instructions in the memory may determine, when a connection request to access a network, from a M2M device, will fail or has failed; create, in response to the connection request, a response to the connection request, the response including an indication that the M2M device is to be blocked, by other network devices, from accessing the network; and transmit the response to the connection request to the other network devices, the response to the other network devices including one or more parameters that identify a duration for which the M2M device is to be blocked and an identification of the M2M device.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

Techniques described herein may relate to feedback control for M2M devices when a network element, to which the M2M device connects, has failed. A network device, such as a network gateway, may determine when a network element, that is in the communication path of an M2M device, has failed. In response, the network device may transmit a message through the network that indicates that the M2M device should be blocked from connecting to the network. In one implementation, the M2M device may receive the message, and in response, refrain from attempting to connect to the network for a certain time period. Alternatively or additionally, the message may be received by radio interface nodes or other network devices in the network, which may block the M2M device from connecting to the network for a certain time period. Advantageously, M2M devices that are unable to connect to required network resources can be stopped from needlessly burdening the network with connection requests.

Figure 1:
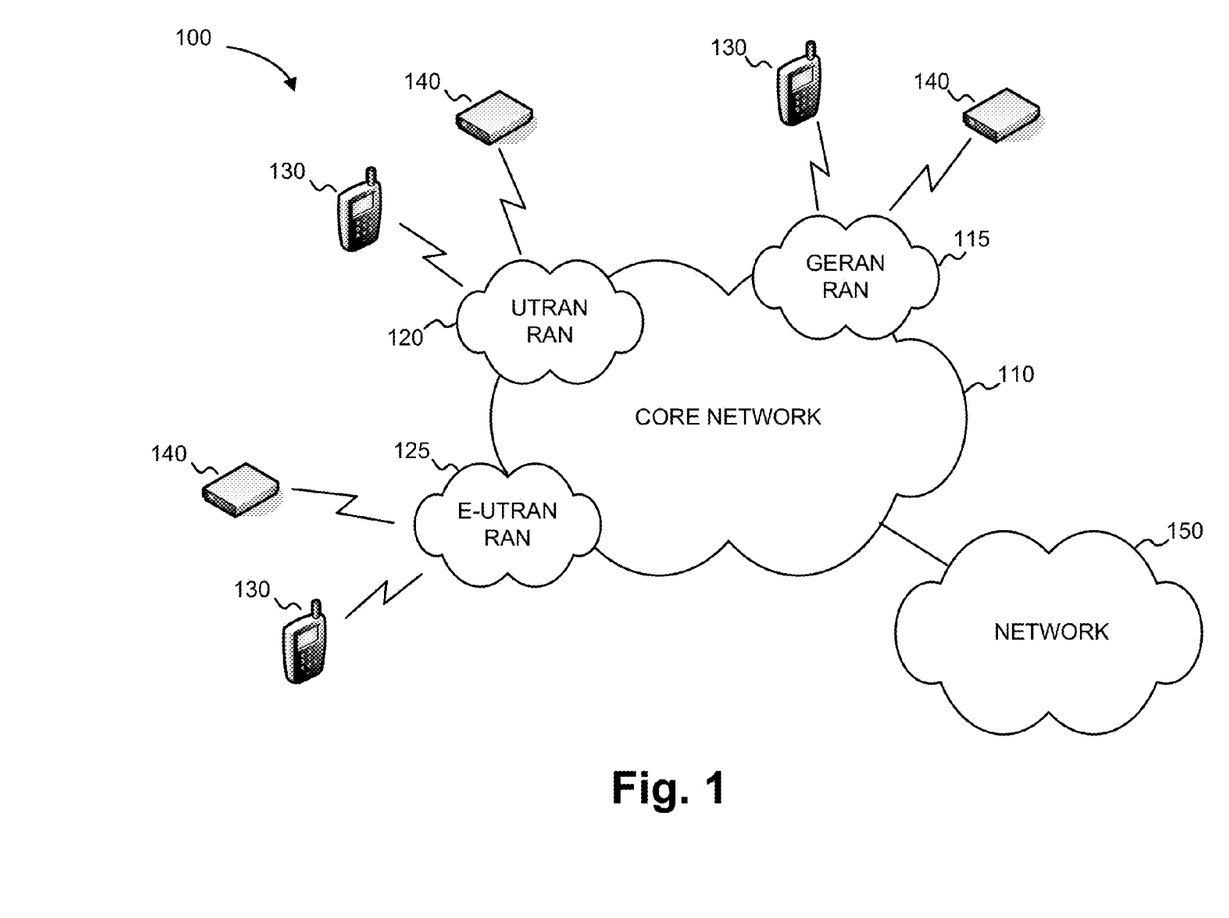
FIG. 1 is a diagram illustrating an example of a telecommunication system.

FIG. 1 is a diagram illustrating an example of a telecommunication system 100. Telecommunication system 100 may include one or more networks designed to connect customers, such as M2M devices, wireless or wired user devices, or computer servers, to one another. System 100 is particularly shown as including a core network 110, which is associated with a number of access networks 115, 120, and 125. Access networks 115, 120, and 125 may generally connect customer devices 130 and 140 to core network 110. Additional networks, such as a network 150 (e.g., an Internet Protocol (IP) network, interexchange carrier network (IXC), and/or local exchange carrier (LEC)) may also connect to core network 110.

Core network 110 may generally provide high capacity communication facilities that connect customer devices 130 and 140 to one another. As illustrated, core network 110 may provide paths for the exchange of information between different networks or sub-networks. Core network 110 may provide network functions relating to one or more of aggregation, authentication, service invocation, service charging, and call control and switching. In one implementation, core network 110 may include a network based on, for instance, the 3GPPP Long Term Evolution (LTE) standard, in which core network 110 facilitates the connectivity of wireless customer devices 130 and 140.

Access networks 115, 120, and 125 may provide connectivity of subscribers, such as customer devices 130 and 140, to core network 110. Three access networks are particularly shown in FIG. 1 as examples of access networks that provide wireless connectivity services. As shown, access network 115 (GERAN RAN) may be a GSM EDGE Radio Access Network. Access network 120 (UTRAN RAN) may be a Universal Mobile Telecommunications System (UMTS) Terrestrial Radio Access Network. Access network 120 may include a collection of nodeBs and radio network controllers that make up the UMTS radio access network. Access network 125 (E-UTRAN RAN) may be an evolved UMTS Terrestrial Radio Access Network. An E-UTRAN RAN may be thought of as the "next generation" version of a UTRAN RAN.

Customer devices 130 and 140 may include devices designed to connect wirelessly to one of access networks 115, 120, and/or 125. Customer devices 130 may be mobile devices, such as mobile telephones, smart phones, electronic notepads, and/or personal digital assistants (PDAs). Customer devices 130 may establish wireless communication sessions with radio interface nodes (e.g., eNodeBs, nodeBs) in access networks 115, 120, and/or 125. The wireless communication sessions may be used for voice (e.g., telephone calls) or data sessions.

Customer devices 140 may include M2M devices. A M2M device, as used herein, may refer to any device that is designed to autonomously communicate with another device or network, such as a server connected to network 150. An M2M device may include a sensor or meter that is designed to capture an event (such as temperature, inventory level, etc.), which is relayed through a network (e.g., access networks 115/120/125, core network 110, and network 150) to an application (e.g., a software application executing as part of a server device connected to network 150), that translates the captured event into meaningful information (for example, items need to be restocked).

Network 150 may include any type of network, such as a public IP packet-based network (e.g., the Internet), a private IP network, an interexchange carrier network, etc. Core network 110 may connect to network 150 via a gateway device that is used to control access to network 150.

Although FIG. 1 illustrates exemplary components of telecommunications system 100, in other implementations, telecommunications system 100 may include additional, fewer, different, or differently arranged components than those illustrated in FIG. 1 and described herein. Moreover, one or more of the functions performed by one of the components shown in FIG. 1 may be performed by other components shown in FIG. 1.

Figure 2:
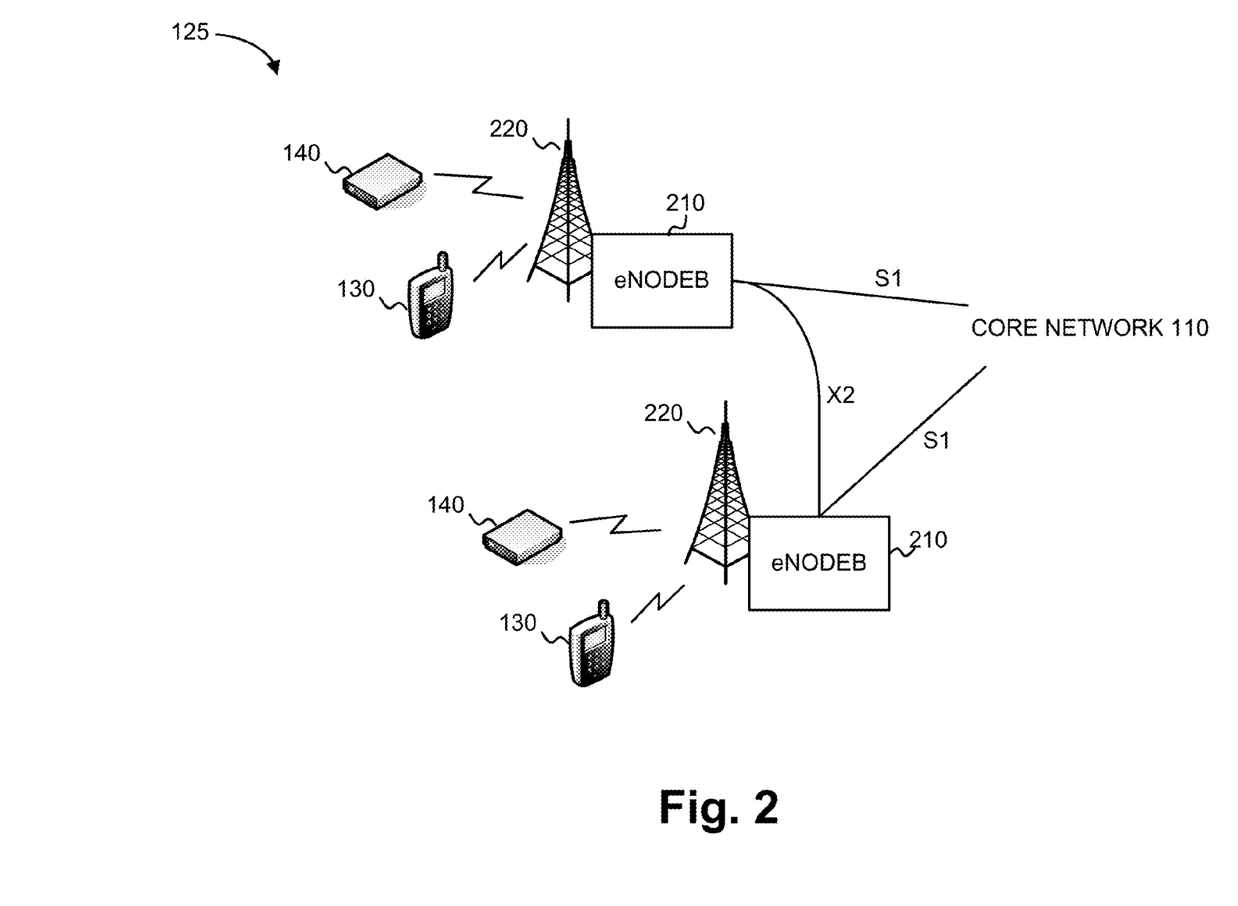
FIG. 2 is a diagram illustrating example components of an access network.

FIG. 2 is a diagram illustrating example components of an access network. In this example, access network 125 (E-UTRAN RAN) is illustrated. Other types of access networks (e.g., UTRAN or GERAN) may be alternatively or additionally implemented. The E-UTRAN standard may implement the air interface for LTE systems.

Access network 125 may particularly include eNodeBs 210, which may be associated with corresponding antennas 220. eNodeBs 210 in access network 125 may be connected, such as via a wired connection, to one another. eNodeBs 210 may also connect to core network 110. In one implementation, eNodeBs 210 may connect to one another via a X2 interface and to core network 110 via a S1 interface. Each eNodeB 210 may include hardware to communicate with customer devices 130 and 140 using WDCMA/TD-SCDMA (Wideband Code Division Multiple Access/Time Division Synchronous Code Division Multiple Access) as the air interface technology.

Figure 3:
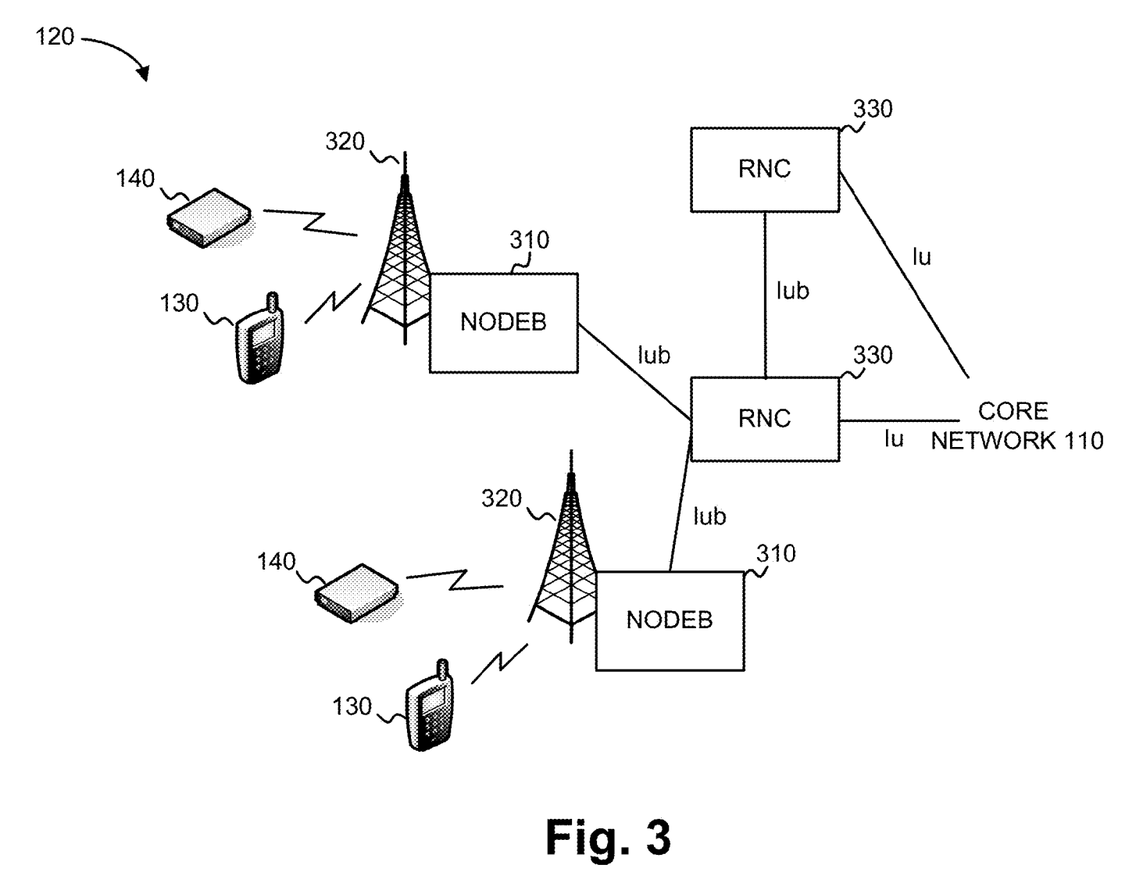
FIG. 3 is a diagram illustrating example components of another access network.

FIG. 3 is a diagram illustrating example components of another access network. In this example, access network 120 (UTRAN RAN) is illustrated. The UTRAN standard may implement a UMTS radio access network.

Access network 120 may particularly include nodeBs 310, which may be associated with corresponding antennas 320. NodeBs 310 in access network 120 may be connected, such as via a wired connection, to one another through radio network controllers (RNCs) 330. RNCs 330 may provide control functions for nodeBs 310. Each RNC 330 may connect to nodeBs 310 via a logical interface called an "Iub" interface. RNCs 330 may connect to core network 110 via a logical interface called an "Iu" interface and to one another through the "Iub" interface.

Although FIGS. 2 and 3 illustrate example components of access networks 120 or 125, in other implementations, access networks 120/125 may include additional, fewer, different, or differently arranged components than those illustrated in FIGS. 2 and 3 and described herein. Moreover, one or more of the functions performed by one of the components shown in FIGS. 2 and 3 may be performed by other components shown in FIGS. 2 and 3.

Figure 4:
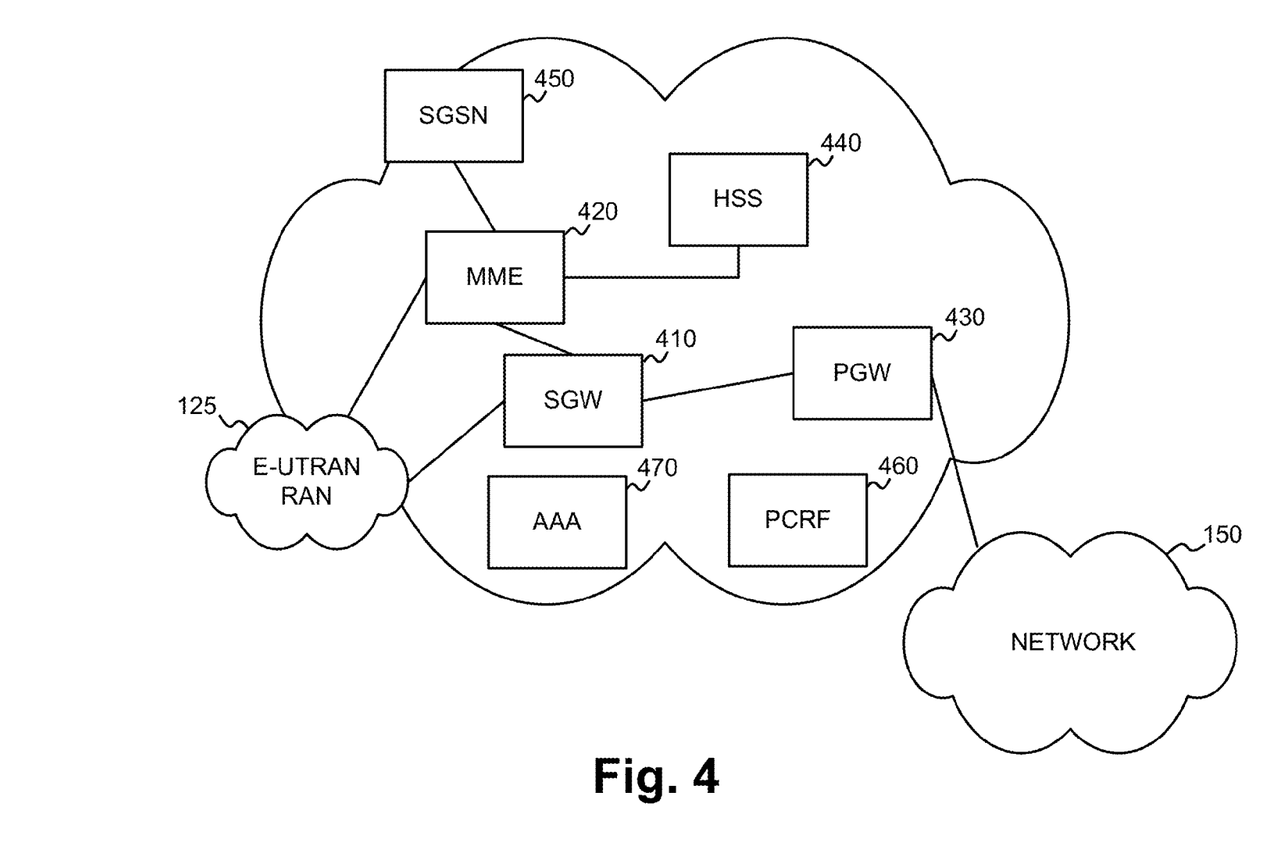
FIG. 4 is a diagram illustrating an example of components in a core network.

FIG. 4 is a diagram illustrating an example of components in core network 110. Core network 110 may be implemented as a flat IP-based network. Core network 110 may include a serving gateway (SGW) 410, a mobility management entity (MME) 420, a packet data network gateway (PGW) 430, a home subscriber service (HSS) 440, a serving GPRS support node (SGSN) 450, a policy and charging rules function (PCRF) 460, and an Authentication, Authorization, and Accounting (AAA) server 470.

SGW 410 may include one or more devices that perform signaling conversion between the transport used within an access network and the IP-based transport used within core network 110. SGW 410 may route and forward user data packets, while also acting as the mobility anchor for the user plane during inter-eNodeB handovers and as the anchor for mobility between LTE and other technologies. SGW 410 may also manage and store customer device contexts, e.g. parameters of the IP bearer service and network internal routing information.

MME 420 may include one or more devices that generally act as a control node for core network 110. MME 420 may be responsible for idle mode customer device tracking, may be involved in the bearer activation/deactivation process, and may be responsible for choosing the SGW 410 for a device at the initial attach and at the time of intra-network handovers. MME 420 may also be responsible for authenticating users through interaction with HSS 440.

PGW 430 may include one or more devices that act as a gateway for additional networks, such as network 150. In other words, PGW 430 may provide connectivity from the customer device to external packet data networks by being the point of exit and entry of traffic for the customer device. A customer device may have simultaneous connectivity with more than one PGW 430 for accessing multiple packet data networks. PGW 430 may perform policy enforcement, packet filtering, and other services relating to the access of the customer device to the external packet data network. In a GPRS network, PGW 430 may be referred to as a gateway GPRS support node (GGSN).

HSS 440 may include one or more devices that may act as a master user database for core network 110. HSS 440 may contain profiles for subscribers (customers), perform authentication and authorization of the customers, and may provide information about the subscriber's location and IP information.

SGSN 450 may provide services to one or more access networks and may be generally responsible for the delivery of data packets to and from mobile stations (e.g., customer devices 130 and 140) within its geographical service area. SGSN 450 may perform packet routing and transfer, mobility management, logical and link management, and authentication and charging functions.

PCRF 460 may operate in core network 110 to determine policy rules that apply to customer devices 130 and 140. PCFR 460 may access subscriber databases and other systems to allow for the creation of rules and the making of policy decisions relating to subscribers. PCRF 460 may be accessed by, for example, SGW 410 and/or PGW 430.

AAA server 470 may provide services that relate to the authentication, authorization, and tracking of the access to core network 110 by customer devices 130 and 140. In one implementation, AAA server 470 may include a Remote Authentication Dial In User Service (RADIUS) server. AAA server 470 may generally operate to, or assist in, authentication of devices before granting the devices access to core network 110, authorization of connecting devices for certain network services, and/or to track usage of those services. AAA server 470 may be accessed by, for example, SGW 410 and/or PGW 430. Alternatively, AAA server 470 implemented as a part of SGW 410, PGW 430, and/or PCRF 460.

Although FIG. 4 illustrates example components in core network 110, in other implementations, core network 110 may include additional, fewer, different, or differently arranged components than those illustrated in FIG. 4 and described herein. Moreover, one or more of the functions performed by one of the components shown in FIG. 4 may be performed by other components shown in FIG. 4.

Figure 5:
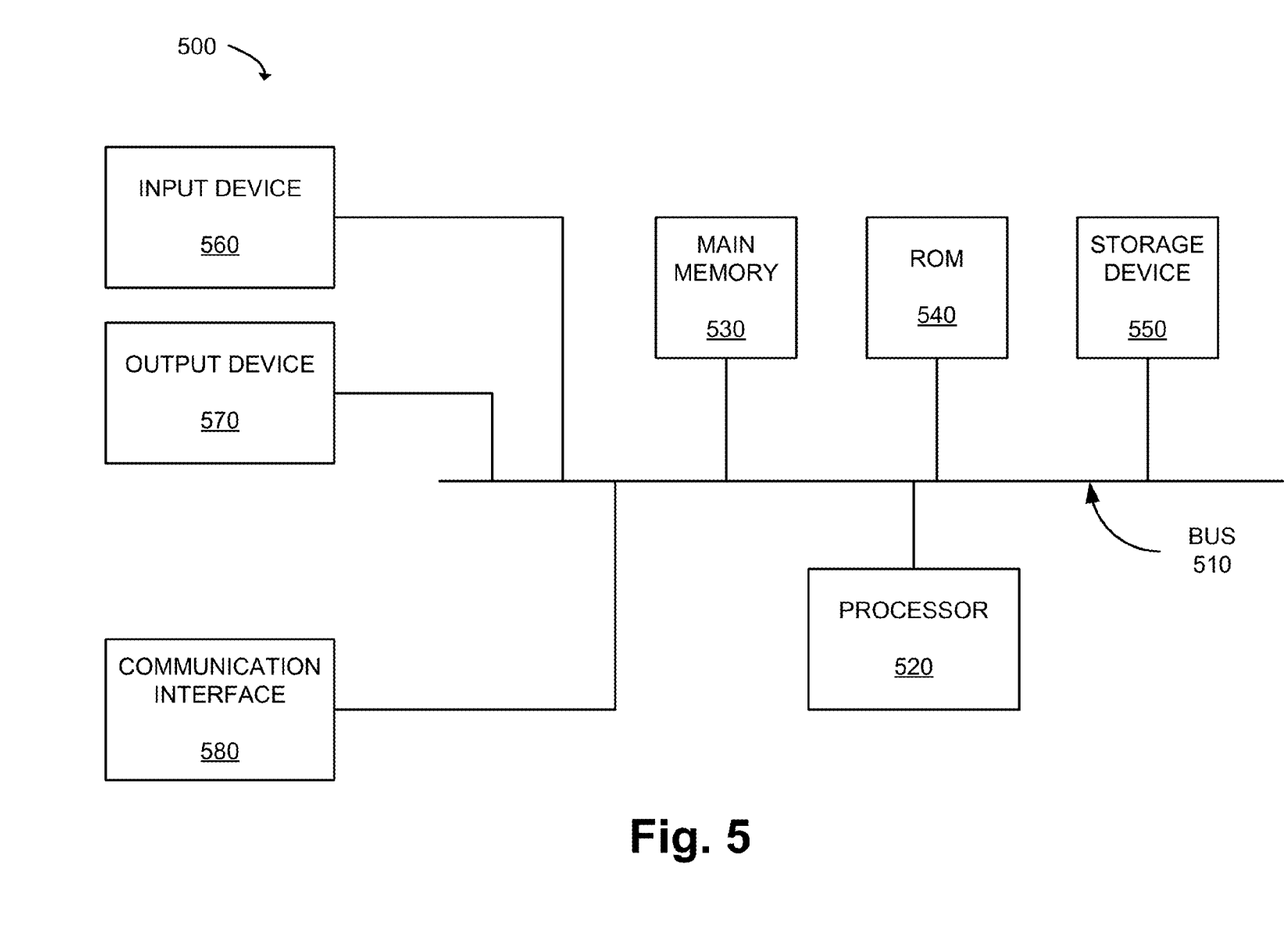
FIG. 5 is a diagram of example components of a device.

FIG. 5 is a diagram of example components of a device 500, which may correspond to a network device (e.g., a server, a database, eNodeB 220, nodeB 310, RNC 330, SGW 410, MME 420, PGW 430, HSS 440, SGSN 450, PCRF 460, and/or AAA server 470) in system 100. As shown in FIG. 5, device 500 may include a bus 510, a processor 520, a main memory 530, a read only memory (ROM) 540, a storage device 550, an input device 560, an output device 570, and a communication interface 580.

Bus 510 may include a path that permits communication among the components of device 500. Processor 520 may include a processor, a microprocessor, or processing logic (e.g., an application specific integrated circuit (ASIC) or a field programmable gate array (FPGA)) that may interpret and execute instructions. Main memory 530 may include a random access memory (RAM) or another type of dynamic storage device that may store information and instructions for execution by processor 520. ROM 540 may include a ROM device or another type of static storage device that may store static information and instructions for use by processor 520. Storage device 550 may include a magnetic and/or optical recording medium and its corresponding drive, or a removable form of memory, such as a flash memory.

Input device 560 may include a mechanism that permits an operator to input information to device 500, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 580 may include any transceiver-like mechanism that enables device 500 to communicate with other devices and/or systems. For example, communication interface 580 may include mechanisms for communicating with another network device.

As will be described in detail below, device 500 may perform certain operations relating to controlling radio resources. Device 500 may perform these and other operations in response to processor 520 executing software instructions contained in a computer-readable medium, such as main memory 530. A computer-readable medium may be defined as a non-transitory memory device. A memory device may include a space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 5 illustrates exemplary components of device 500, in other implementations, device 500 may include additional, fewer, different, or differently arranged components than those illustrated in FIG. 5 and described herein. As an example, in some implementations, input device 560 and/or output device 570 may not be implemented by device 500. In particular, device 500 may represent a network device such as eNodeB 220, nodeB 310, RNC 330, SGW 410, MME 420, PGW 430, HSS 440, SGSN 450, PCRF 460, or AAA server 470. In these situations, device 500 may be a "headless" device that does not explicitly include an input or an output device.

Figure 6:
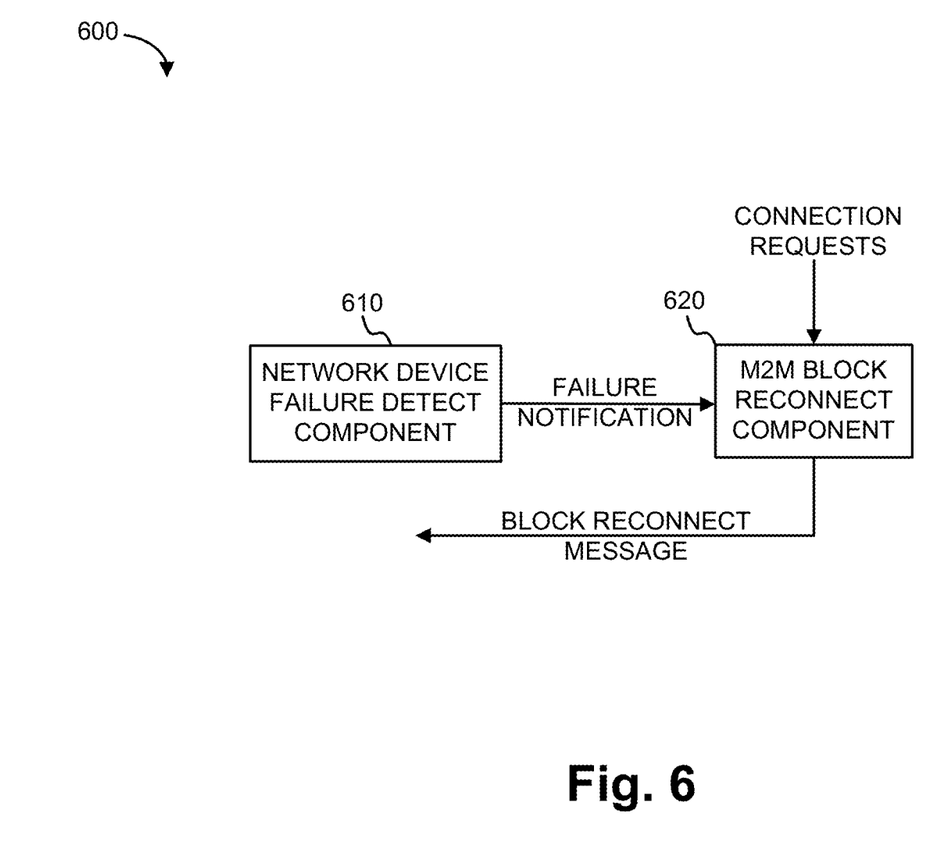
FIG. 6 is a diagram illustrating an example of functional components for blocking the reconnection of M2M devices in response to network device failures.

FIG. 6 is a diagram illustrating an example of functional components 600 in system 100 for blocking the reconnection of M2M devices in response to network device failures. Functional components 600 may particularly include network device failure detect component 610 and M2M block reconnect component 620. In one implementation, network device failure detect component 610 and M2M block reconnect component 620 may be implemented in PGW 430 (or in other gateway devices, such as for a GPRS network, a gateway GPRS support node). Alternatively, network device failure detect component 610 and M2M block reconnect component 620 could be implemented in a different device in system 100 or implemented at separate devices in system 100.

Network device failure detect component 610 may monitor core network 110 to detect the failure of a network device. Network device failure detect component 610 may, for example, monitor the health of AAA server 470 or of other network devices in core network 110. Monitoring a network device may be based on an explicit monitoring, such as by actively contacting AAA server 470 to ensure that AAA server 470 is operating properly. Alternatively or additionally, monitoring the network device may be based on an implicit monitoring, in which, for example, network device failure detect component 610 may detect the failure of a network device based on messages received from other network devices, the cessation of expected traffic from another network device, or another type of analysis of traffic received by network device failure detect component 610.

In response to the detection of the failure of a network device, network device failure detect component 610 may notify M2M block reconnect component 620 of the failure. Network device failure detect component 610 may similarly notify M2M block reconnect component 620 when a failed device comes back online. In this manner, M2M block reconnect component 620 may, at any particular time, know which network devices in core network 110 are not operating. For example, assume that at one particular time, five AAA servers 470 and one PCRF server 460 have failed and suitable backup devices have not taken over the traffic for these devices. M2M block reconnect component 620 may keep track of the fact that these servers have failed.

In one implementation, the operations performed by network device failure detect component 610 may be applied only to traffic from M2M devices. Whether a connecting M2M device is a M2M device may be determined by an access point name (APN) assigned to the device.

M2M delay reconnect component 620 may receive connection requests from M2M devices. The connection requests may include requests to access an external network, such as network 150, and may be received as part of the control traffic when a client device, such as an M2M device, connects to core network 110. M2M delay reconnect component 620 may, in response to a connection request from an M2M device that is attempting to connect through a control path that has failed, may respond by issuing a message (BLOCK RECONNECT MESSAGE) that instructs the M2M device and/or the radio interface associated with the M2M device to block any further reconnect attempts by the M2M device. In other words, the message may operate to stop the M2M device from reconnecting. The message may include a time period that indicates for how long the M2M device is to be blocked. By blocking the M2M device from reconnecting, network resources, that may otherwise be wasted as the M2M device repeatedly tries to reconnect to core network 110, may be preserved. This can be particularly advantageous in the situation in which many different M2M devices use core network 110 and, without blocking, the M2M devices may tend to simultaneously flood core network 110 with connect messages.

In one implementation, the block reconnect message may be implemented by adding additional parameter (e.g., an overloaded private extension) to messages sent as part of an existing connection protocol. For example, as part of the creation of a PDP (packet data protocol) context, through which M2M device 140 may connect to network 150, a create PDP context request message may be generated and forwarded to PGW 430. PGW 430 may respond with a create PDP context response message that gives details of the created context or gives reasons for a context creation failure. The PDP context request message and PDP context response message may include fields that allow custom protocol information to be included in the message. Consistent with aspects described herein, in one implementation, the create PDP context response message may include one or more additional, non-standard parameters. These parameters may instruct the radio interface, the M2M device, and/or other network devices to refrain for reconnecting to core network 110.

Although FIG. 6 illustrates example functional components 600, in other implementations, functional components 600 may include additional, fewer, different, or differently arranged functional components than those illustrated in FIG. 6 and described herein. Moreover, one or more of the functions performed by one of the functional components shown in FIG. 6 may be performed by other functional components shown in FIG. 6.

Figure 7:
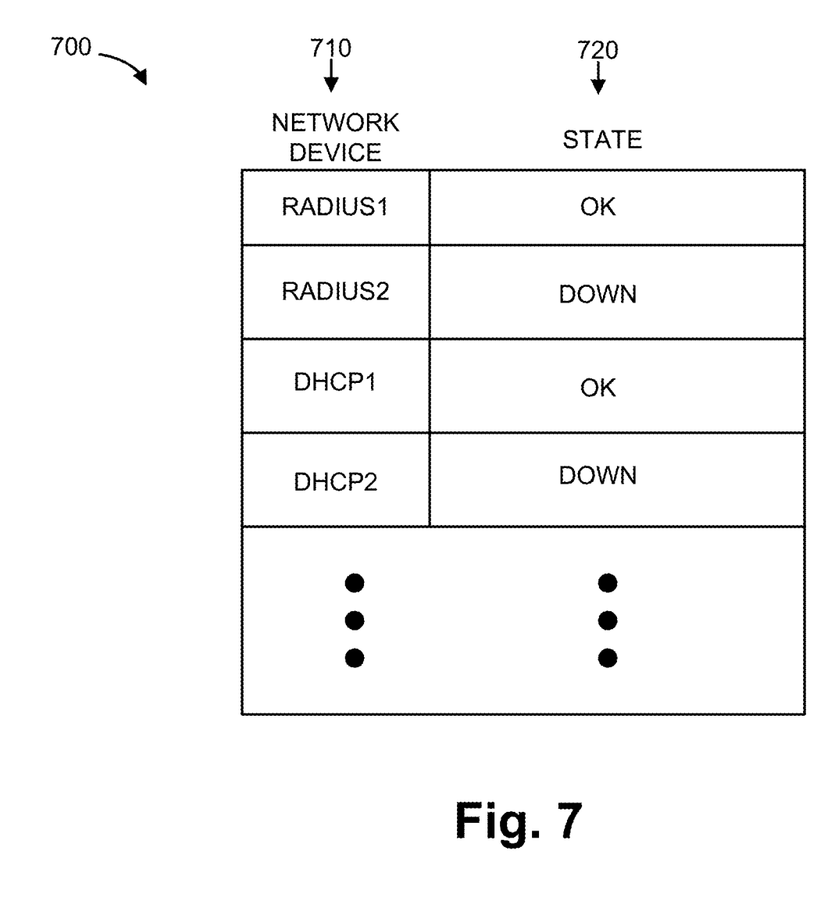
FIG. 7 is an example data structure that may be associated with a device.

FIG. 7 is an example data structure 700 that may be associated with PGW 430. Data structure 700 may be maintained by M2M block reconnect component 620, based on failure notifications from network device failure detect component 610, and may generally be used to store the state of various network devices in core network 110. While only one data structure is described below, data structure 700 may include multiple data structures stored locally at PGW 430, or stored at one or more different and possibly remote locations. As illustrated, data structure 700 may maintain a group of entries in the following example fields: a network device field 710 and a state field 720.

Network device field 710 may store information that identifies network devices in core network 110. A network device may be identified, for example, by a name, address (e.g., IP address) or other identifier. Network device field 710 may also include an indication of the type or function of each network device. The first two entries in data structure 700, for instance, may correspond to AAA servers 470 that are particularly configured to implement the RADIUS (Remote Authentication Dial In User Service) protocol. The third and fourth entries in data structure 700 may correspond to DHCP (dynamic host configuration protocol) servers that perform configuration tasks, such as assigning IP addresses, to devices connecting to the network. As shown by state field 720, network device failure detect component 610 has determined that the first RADIUS server (RADIUS1) and the first DHCP server (DHCP1) have a state of "ok", which may mean that these servers are functioning normally. The second RADIUS server (RADIUS2) and the second DHCP server (DHCP2) have a state of "down", which may mean that these servers are offline (i.e., they have failed). Network connection requests that are to be handled by the "down" servers may fail.

Although FIG. 7 shows example fields of data structure 700, in other implementations, data structure 700 may include fewer fields, different fields, differently arranged fields, or additional fields than depicted in FIG. 7.

Figure 8:
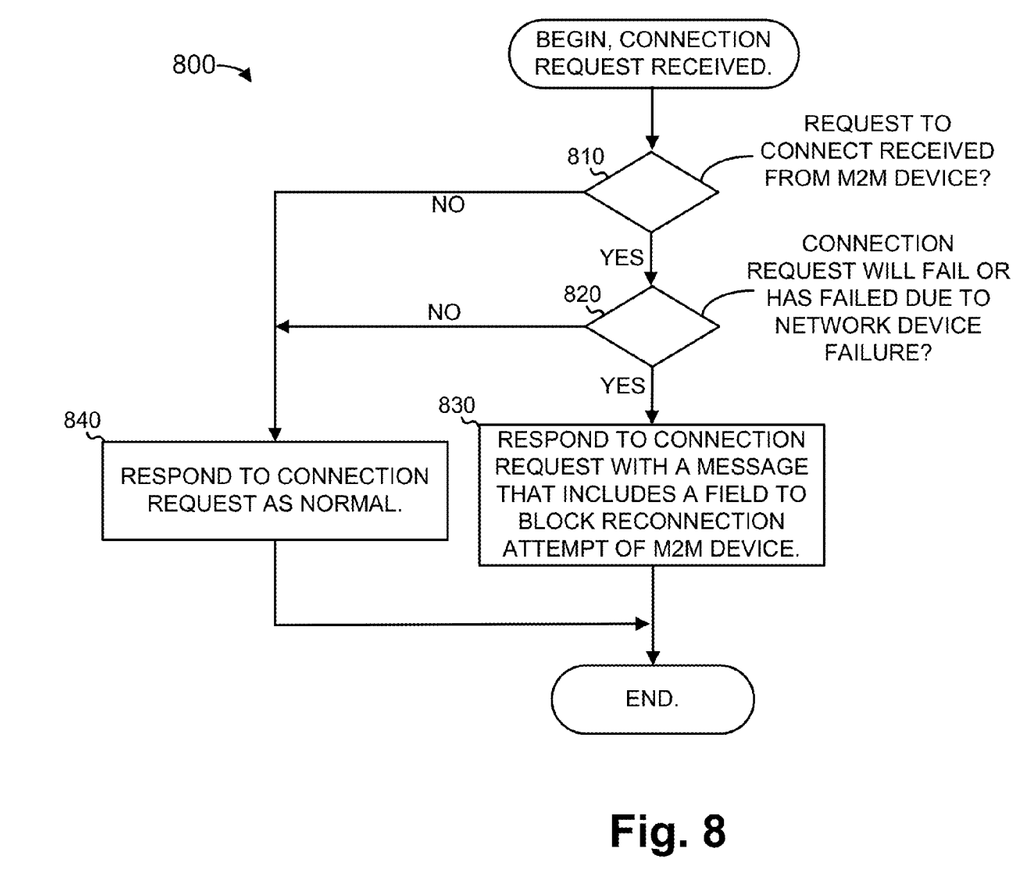
FIG. 8 is a flow chart illustrating an example process for blocking M2M devices from connecting to a network.

FIG. 8 is a flow chart illustrating an example process 800 for blocking M2M devices from connecting to a network. Process 800 may be performed by PGW 430 or by another network device in core network 110. Process 800 may be performed in response to a connection request from the M2M device. The connection request may be, for example, a PDP context creation request.

Process 800 may include determining whether the received connection request is from an M2M device (block 810). In some implementations, whether a connecting device is an M2M device (e.g., M2M device 140) or a user controlled portable device (e.g., customer device 130), may be determined based on the APN assigned to the device. Some telecommunication providers may, for instance, assign M2M devices to separate APN names than non-M2M devices. Alternatively, other techniques for determining whether a device is an M2M device may be used, such as a technique based on the type of data received from the device or information known about the device from previous communications with the device.

When the connection request is from an M2M device (block 810—YES), it may be determined whether the connection for the connecting M2M device will fail or has failed due to the failure of a network device (block 820). M2M delay reconnect component 620 may, for instance, determine, based on data structure 700, whether one or more network devices that are required for the successful creation of a bearer connection for the M2M device, have failed. If so, M2M delay reconnect component 620 may determine that the M2M device will not be able to connect to core network 110 (i.e., will not be able to create a bearer connection). As an example of a connection failure, assume that the DHCP or RADIUS servers required to create a bearer session for a connecting M2M device is down. M2M block reconnect component 620 may thus determine that the M2M device will not be able to create a bearer connection to connect, through core network 110, to network 150.

When the connecting device is not an M2M device (block 810—NO) or it is determined that a network device failure should not cause the connection request for the M2M device to fail (block 820—NO), the connection request for the device may be responded to as per a normal connection request (block 840). PGW 430 may, for example, generate a PDP context response message, which may give details of the activate PDP session.

When the connecting device is an M2M device (block 810—YES) and it is determined that the connection request will fail or has failed (block 820—YES), process 800 may further include responding to the connection request with a message that includes a field that indicates that the M2M device should be blocked from reconnecting to the network (block 830). PGW 430 may, for example, generate a PDP context response message that indicates that the PDP session creation has failed. The PDP context response message may additionally include one or more optional fields that may be used to indicate for how long the M2M device is to refrain from reconnecting and/or be blocked from reconnecting to the network. The optional fields may be, for example, additional parameters in the additional parameters list of the protocol configuration options (PCO) of a PDP context response message, as defined by the 3GPP Technical Specification 24.008.

Figure 9:
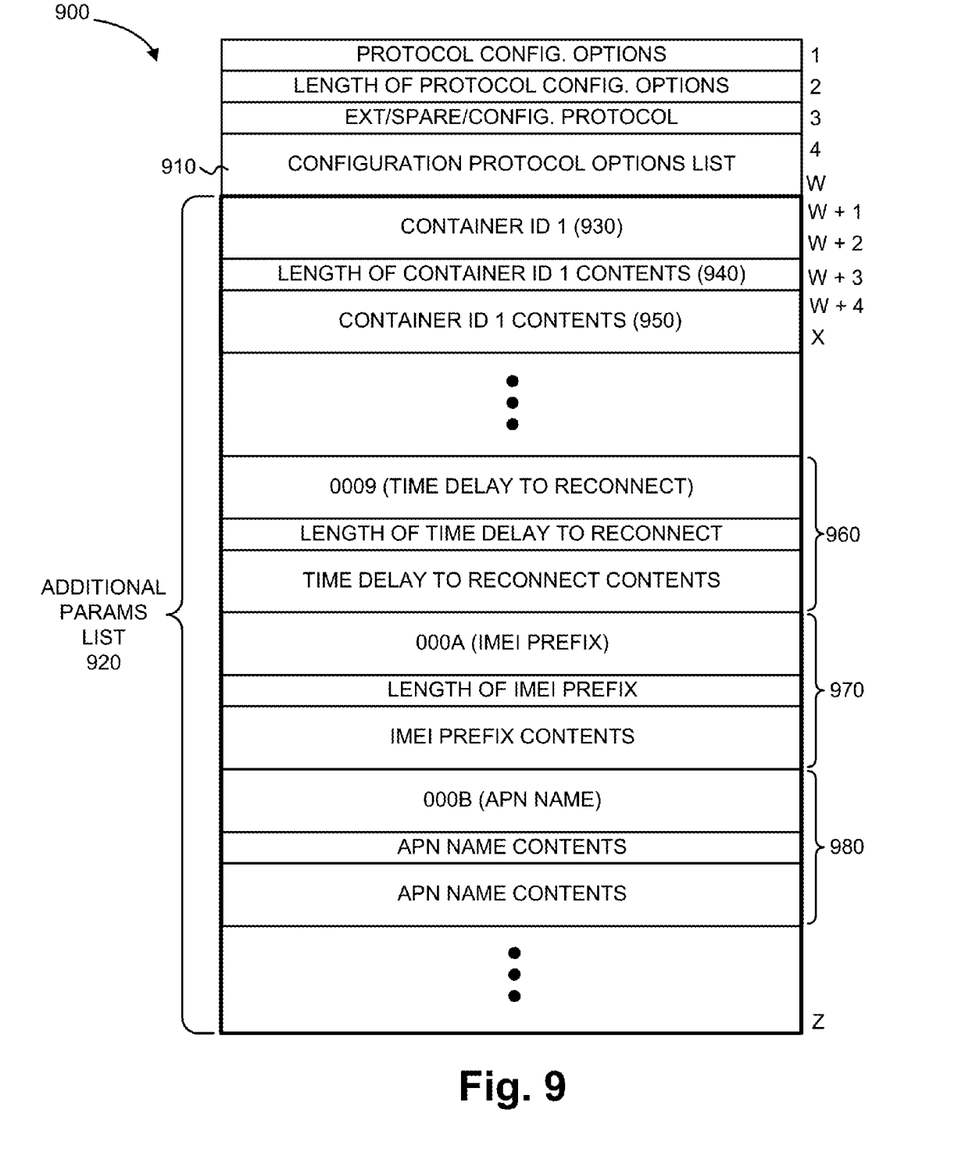
FIG. 9 is a diagram illustrating one example section of a message.

FIG. 9 is a diagram illustrating one example PCO section 900, such as the message sent in block 830 (e.g., a PDP context response message). Message 900 may include a number of sections relating to options for a message such as a PDP context response message.

PCO section 900 may be z octets long, in which each line in FIG. 9 corresponds to an octet (numbered on the right side of PCO section 900). As shown, the first three octets may include general information relating to PCO section 900. The first octet may include an initial information element identifier that identifies the PCO. The second octet may be used to define the length of the protocol configuration options contents. The third octet may include predefined protocol configuration values. Beginning at octet four, PCO section 900 may include a variable number of configuration protocol options, section 910 (octets four through w). Each configuration protocol option may be a logical unit that contains information relating to a protocol relevant to the PDP context message.

PCO section 900 may also include additional parameters list 920. Additional parameters list 920 may generally include a list of special parameters and/or requests that are to be transferred between a mobile device and the network. In general, each parameter entry in additional parameters list 920 may be contained in a separate container and may be used to convey information not relating to a particular protocol.

Each parameter entry in additional parameters list 920 may include a two octet container identifier (ID) field 930, a one octet length field 940, and a one or more octet contents field 950. Container ID field 930 may identify the parameter and length field 940 may include the length of contents field 950. Contents field 950 may contain the contents associated with the parameter.

Three parameter list entries are particularly illustrated in FIG. 9: time delay to reconnect parameter 960, IMEI prefix parameter 970, and APN name parameter 980. Parameters 960-980 may be overloaded private extensions, such that network devices that are not configured to recognize the parameters will ignore them.

Time delay to reconnect parameter 960, illustrated as being identified using the example ID value of 0009 (hexadecimal), may contain a value indicating a time period for which an identified M2M device (or set of M2M devices) is to refrain from or be blocked from reconnecting to the network. For messages traveling in the direction of the mobile device to the network, the time delay to reconnect contents field may be empty and the length of time delay to reconnect field may be zero. For messages traveling in the direction of the network to the mobile device, the time delay to reconnect contents field may include a value indicating a time period (e.g., in seconds) for which the M2M device(s) are not allowed to connect to the network. This information may be used by, for example, MME 420, eNodeB 210, NodeB 310, or RNC 330 in blocking the M2M device from connecting to the network. In some implementations, the M2M device may receive the delay value and refrain from reconnecting for the indicated time period.

The delay value to include for the time delay to reconnect parameter may be determined in a number of ways. For instance, the value may be preset to a default value or set by a network administrator. In other implementations, the time value to use could be dynamically adjusted or set based on information relating to the M2M device.

IMEI prefix parameter 970, illustrated as being identified using the example ID value 000A (hexadecimal), may include a list of IMEI (International Mobile Equipment Identity) values that define which mobile devices are applicable to time delay to reconnect parameter 960. An IMEI may be a code that uniquely identifies a particular mobile device. The list of IMEI values in the IMEI prefix contents field may thus define a list of mobile devices, such as M2M devices, to which the time delay to reconnect parameter should be applied.

APN name contents field 990, illustrated as being identified using the example ID value 000B (hexadecimal), may include one or more APN identifiers. As previously mentioned, mobile devices connecting to core network 110 may be assigned to an APN. A non-empty value for APN name contents field may define one or more APNs to which the time delay to reconnect parameter should be applied.

Figure 10:
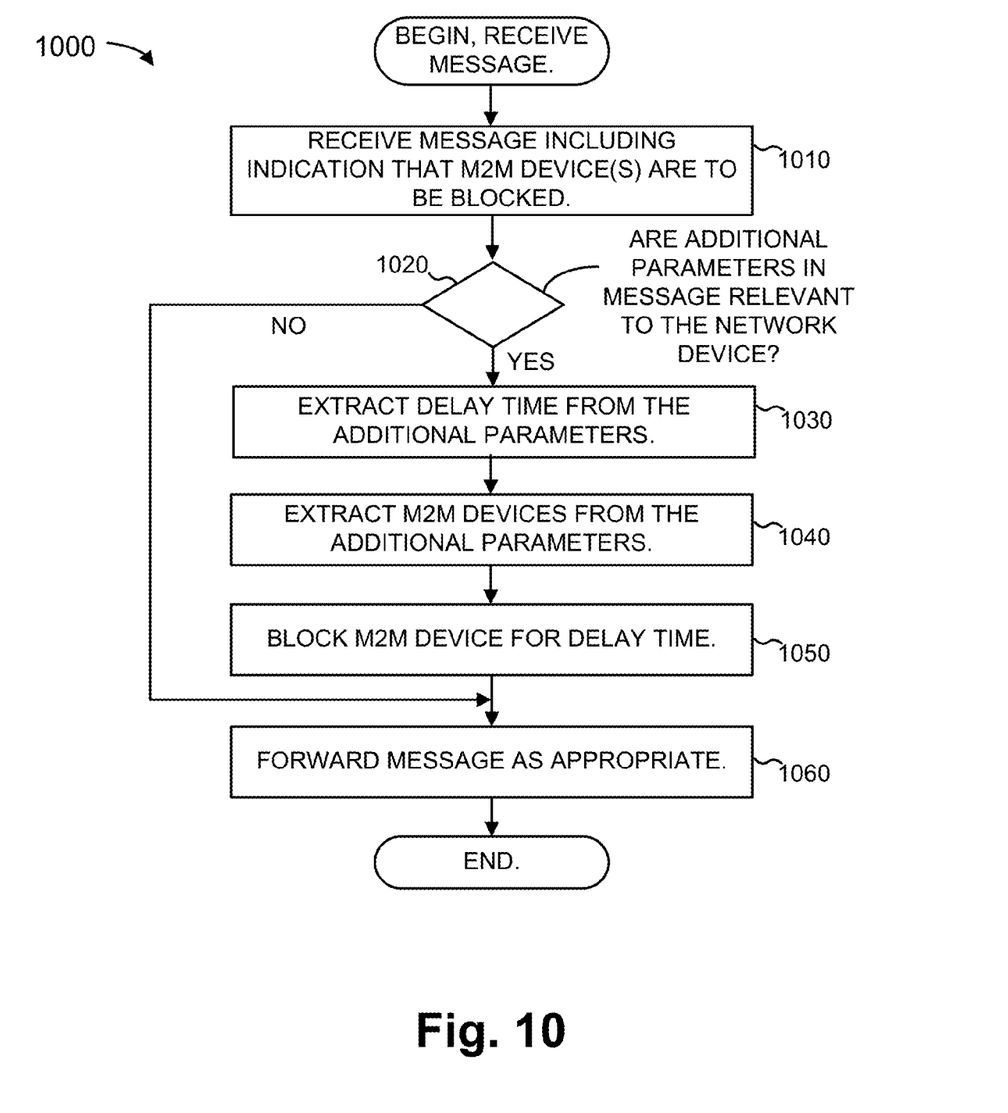
FIG. 10 is a flow chart illustrating an example process for handling a message.

FIG. 10 is a flow chart illustrating an example process 1000 for handling a message, such as a PDP context response message, as transmitted in blocks 830 and 840, by various network devices. The various network devices may include, for example, all nodes that take part in the bearer corresponding to the M2M device. In other implementations, other network devices may receive and act on the message or on a modified version of the message.

Process 1000 may include receiving the message indicating that M2M devices are to be blocked from accessing the network (block 1010). As previously mentioned, the message may include a PDP context response message generated by PGW 430. The PDP content response message may particularly include a PCO section that includes additional parameters, such as parameters 960-980, that describe M2M devices that are to be blocked, and the duration for which the devices are to be blocked.

Process 1000 may further include determining whether the additional parameters are relevant to the receiving network device (block 1020). Some network devices in the control path of the PDP content response message may not take part in blocking M2M devices. These devices may simply ignore the additional parameters.

When the additional parameters are relevant to the receiving network device, (block 1020—YES), the network device may extract the time delay value from the time delay to reconnect parameter (block 1030) and the M2M devices to which the time delay value applies (1040). The M2M devices to which the time delay value applies may be extracted from the IMEI prefix parameter and/or the APN name parameter. In some situations, both the IMEI prefix parameter and the APN name parameter may be set, indicating that the network device is to block all M2M devices that are included in the IMEI prefix list or that correspond to the APN name value. In other situations, only one of the IMEI prefix parameter or the APN name parameter may be set.

Process 1000 may further include blocking the indicated M2M devices for the indicated time period (block 1050). "Blocking" the M2M device may, depending on the network device, correspond to different operations. For example, for a radio interface node, the node may jam or otherwise not respond to radio requests from the M2M device, effectively not allowing the M2M device to attach to the radio interface node. For other network devices, such as MME 420, blocking the M2M device may correspond to denying a connection request from the M2M device. The network device may block the M2M device for the duration of the time period.

In some situations, an M2M device may be configured to, in response to a message from the network, refrain from attempting to connect to the network for at least a certain time period. With M2M devices that support this feature, a message instructing that the M2M device should be blocked from the network may cause the M2M device to not attempt to connect to the network for the indicated time period.

Process 1000 may further include forwarding the message as appropriate (block 1060). The message may be forwarded to a next network device in the control path. For example, PGW 430 may generate the PDP context response message, which may be forwarded to SGW 410, which may forward the PDP context response message to MME 420. In general, the PDP context response message, or a different message that includes the additional parameter, may be transmitted to all nodes that take part in the bearer corresponding to the effected M2M device(s). In some situations, the original message (e.g., the PDP context response message) may be reformatted or used to generate a different message that includes the relevant information from the additional parameters. For example, when supported by the M2M device, a radio interface node may, based on an indication that a particular M2M device is to be blocked, may signal the particular M2M device, using a custom signaling format, to refrain from reconnecting to the network.

Through the techniques described above, feedback may be generated based on network connection messages to reduce network congestion caused by the retrying of network connection requests that will fail due to the failure of a network device. Advantageously, the techniques described herein can reduce network traffic spikes that may otherwise be caused by a large number of devices repeatedly trying to reconnect in response to the failure of a network device.

Figure 11:
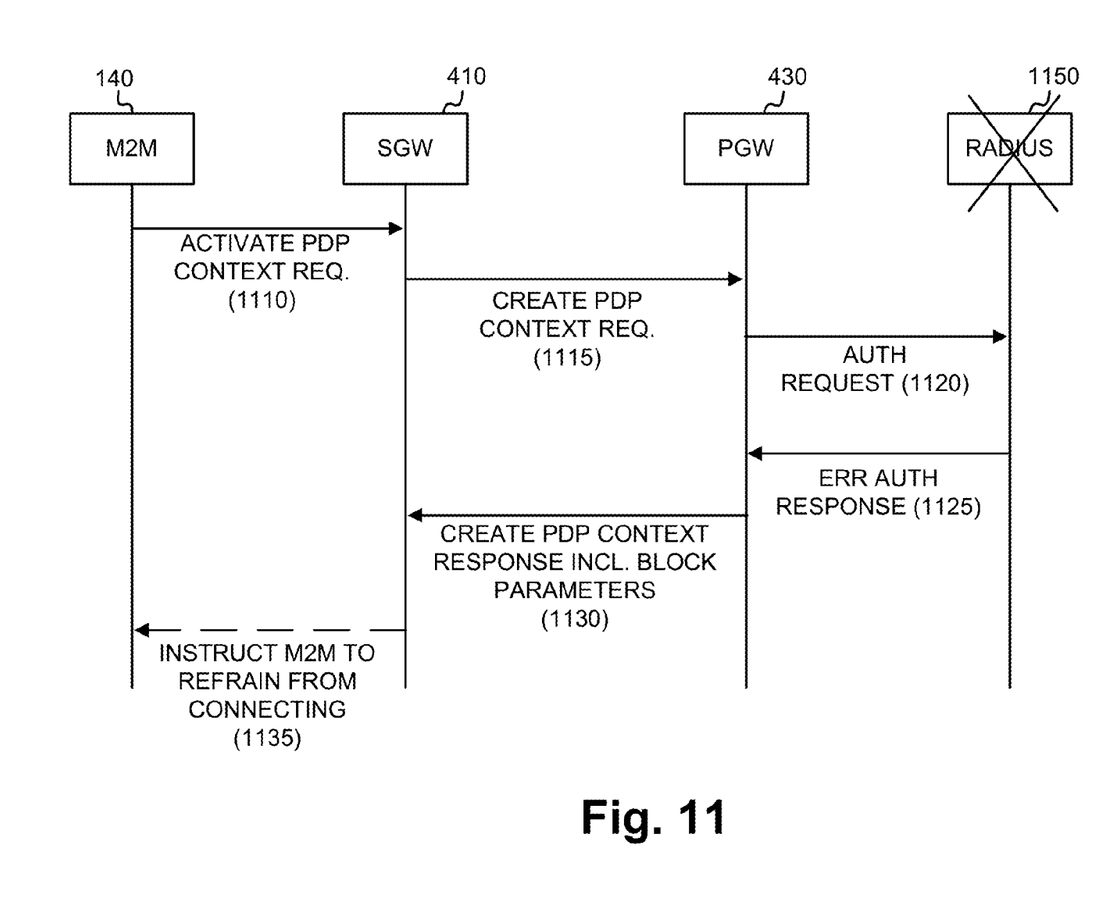
FIG. 11 is a diagram illustrating an example of a signal flow.

FIG. 11 is a diagram illustrating an example of a signal flow, in system 100, in which a network device failure may cause M2M device connection requests to fail. As shown, an M2M device 140 may communicate with SGW 410, PGW 430, and RADIUS server 1150 (e.g., one of AAA servers 470). Assume RADIUS server 1150 has failed and connection requests that rely on RADIUS server 1150 will thus fail.

M2M device 140 may, at some point, attempt to connect to packet data network 150. M2M device 140 may issue an activate PDP context request (message 1110). SGW 410 may receive the request and respond by forwarding a create PDP context request to PGW 420 (message 1115). PGW 420, as part of the initiation of the PDP context, may contact RADIUS server 1150. As previously mentioned, assume RADIUS server 1150 is down. PGW 430 may thus not attempt to access RADIUS server 1150. Alternatively, and as shown in FIG. 11, PGW 430 may issue an authorization request (message 1120) to RADIUS server 450 and determine that the request was not processed (e.g., via error authentication response message 1125). In either event, PGW 430 may determine that the connection request can not be completed at the current time. PGW 430 may thus respond with a create PDP context response that indicates the connection request has failed (message 1130). In the create PDP context response, PGW 430 may include additional parameters, such as parameters 960-980, which indicate that the M2M device is to be blocked, for a certain time period, from reconnecting. SGW 410 may extract the additional parameters and act to block subsequent requests from the M2M device. SGW 410 may also, for example, forward the create PDP context response, or an indication that the M2M device should be blocked, to other network devices. For example, SGW 410 may inform MME 420 or one or more radio interfaces that the M2M device is to be blocked. Alternatively, and as particularly shown in FIG. 6, a message may be sent to M2M device 140 instructing the M2M device to refrain from reconnecting to the network for a certain time period (message 1135).

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 8 and 10, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   receiving, by a network gateway and from a machine to machine (M2M) device, a connection request to access a network;
   detecting, by the network gateway, a failure of at least one of a plurality of other network devices, the at least one of the plurality of other network devices being required to create a connection to the network for the M2M device;
   responsive to determining, by the network gateway and based on the failure, that the connection request will fail or has failed, creating, by the network gateway, a response to the connection request, the response including an indication that the M2M device is to be blocked, by one or more of the plurality of other network devices, from accessing the network; and
   transmitting, by the network gateway and to one or more of the other network devices, the response to the connection request, the response including one or more parameters that identify a duration for which the one or more of the other network devices are to block the M2M device from accessing the network and an identification of the M2M device.

2. The method of claim 1, further comprising:
   monitoring, by the network gateway, a state of each of the plurality of other network devices,
   wherein detecting the failure of at least one of the plurality of other network devices is based at least in part on the state of the at least one of the plurality of other network devices.

3. The method of claim 1, where the plurality of other network devices includes network devices in a control path of the connection request.

4. The method of claim 1, where the plurality of other devices includes one or more of an Authentication, Authorization, and Accounting server, a serving gateway, a mobility management entity, or a radio interface device in an access network.

5. The method of claim 1, where the connection request is for a connection to a packet-based network.

6. The method of claim 1, where the response to the connection request additionally includes a list of M2M devices, identified by International Mobile Equipment Identity values, that are to be blocked.

7. The method of claim 1, where the response to the connection request additionally includes an access point name associated with M2M devices that are to be blocked.

8. The method of claim 1, where the response to the connection request additionally includes a list of M2M devices that are to be blocked and a duration for which each of the M2M devices are to be blocked.

9. The method of claim 1, wherein the other network devices include one or more radio interface nodes, and where the response to the connection request causes the one or more radio interface nodes to block wireless access for the M2M device.

10. The method of claim 1, where the network gateway device includes a gateway device to a packet-based network.

11. A network gateway comprising:
    a network device failure detect component to monitor a health status of other network devices that are used in establishing connections from machine to machine (M2M) devices to a packet data network; and
    a M2M block reconnect component to, in response to the network gateway receiving, from an M2M device, a connection request to access the packet data network and determining, based on the health status of at least one of the other network devices, that the at least one of the other network devices has failed such that the connection request has failed or will fail, cause one or more of the other network devices to block additional connection requests from the M2M device to the packet data network.

12. The network gateway of claim 11, where the blockage of the additional connection requests from the M2M device is performed for a predetermined time period.

13. The network gateway of claim 11, where the M2M block reconnect component causes one or more of the other network devices to block the additional connection requests by issuing a packet data network context request response message to the one or more of the other network devices.

14. The network gateway of claim 13, where the packet data network context request response message includes parameters that specify a length of time that the additional connection requests are to be blocked and an indication of the affected M2M devices.

15. The network gateway of claim 14, where the indication of the affected M2M devices includes a list of M2M devices, identified by International Mobile Equipment Identity values.

16. The network gateway of claim 14, where the indication of the affected M2M devices includes an access point name.

17. The network gateway of claim 11, where the other network devices include one or more of an Authentication, Authorization, and Accounting server, a serving gateway, a mobility management entity, and a radio interface device in an access network.

18. A computing device provided in a network, where the computing device comprises:
    a memory to store a plurality of instructions; and
    a processor to execute instructions in the memory to:
    receive, from a machine to machine (M2M) device, a connection request to access a network;
    detect a failure of at least one of a plurality of other network devices, the at least one of the plurality of other network devices being required to create a connection to the network for the M2M device;
    responsive to determining, based on the failure, that the connection request will fail or has failed, create a response to the connection request, the response including an indication that the M2M device is to be blocked, by one or more of the plurality of other network devices, from accessing the network; and
    transmit, to one or more of the other network devices, the response to the connection request, the response including one or more parameters that identify a duration for which the one or more of the other network devices are to block the M2M device from accessing the network and an identification of the M2M device.

19. The device of claim 18, where the plurality of other network devices include one or more of an Authentication, Authorization, and Accounting server, a serving gateway, a mobility management entity, and a radio interface device in an access network.

20. The device of claim 18, where the connection request is for a connection to a packet-based network.

21. The device of claim 18, where the response to the connection request additionally includes a list of M2M devices, identified by International Mobile Equipment Identity values, that are to be blocked.

22. The device of claim 18, where the response to the connection request additionally includes an access point name associated with M2M devices that are to be blocked.

23. The device of claim 18, where the response to the connection request additionally includes a list of M2M devices that are to be blocked and a duration for which each of the M2M devices are to be blocked.

24. The device of claim 18, wherein the other network devices include one or more radio interface nodes, and where the response to the connection request causes the one or more radio interface nodes to block wireless access for the M2M device.

* * * * *